(12) United States Patent
Saito et al.

(10) Patent No.: US 9,490,066 B2
(45) Date of Patent: Nov. 8, 2016

(54) METHOD FOR PRODUCING CERAMIC ELECTRONIC COMPONENT

(71) Applicant: Murata Manufacturing Co., Ltd., Nagaokakyo-shi, Kyoto-fu (JP)

(72) Inventors: Junichi Saito, Nagaokakyo (JP); Toshihiko Kobayashi, Nagaokakyo (JP); Makoto Ogawa, Nagaokakyo (JP); Akihiro Motoki, Nagaokakyo (JP); Kenichi Kawasaki, Nagaokakyo (JP); Tatsuo Kunishi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 13/749,741

(22) Filed: Jan. 25, 2013

(65) Prior Publication Data

US 2013/0141836 A1 Jun. 6, 2013

Related U.S. Application Data

(63) Continuation of application No. 13/105,926, filed on May 12, 2011.

(30) Foreign Application Priority Data

May 19, 2010 (JP) ................................. 2010-114923

(51) Int. Cl.
*B05D 5/12* (2006.01)
*H01G 2/10* (2006.01)
*H01G 4/224* (2006.01)

(52) U.S. Cl.
CPC .............. *H01G 2/103* (2013.01); *H01G 4/224* (2013.01)

(58) Field of Classification Search
CPC .......... H01G 2/10; H01G 2/103; H01G 4/224
USPC ........................................... 427/126.2, 126.1
See application file for complete search history.

(56) References Cited

U.S. PATENT DOCUMENTS 6,596,655 B1 * 7/2003 Cheung et al. ............... 438/789
6,960,366 B2 11/2005 Ritter et al.
(Continued)

FOREIGN PATENT DOCUMENTS

| JP | 2000-220074 A | 8/2000 |
| JP | 2001-110670 A | 4/2001 |

(Continued)

OTHER PUBLICATIONS

Machine translation of JP 2008-235698.*
(Continued)

*Primary Examiner* — Austin Murata
(74) *Attorney, Agent, or Firm* — Keating & Bennett, LLP

(57) ABSTRACT

In order to prevent the ingress of moisture into a void section of a component main body of a ceramic electronic component, at least the component main body of the ceramic electronic component is provided with water repellency using a water repellent agent. The water repellent agent is dissolved in a supercritical fluid such as, a supercritical $CO_2$ fluid, as a solvent to provide at least the component main body with water repellency. After providing the water repellency, the water repellent agent on the outer surface of the component main body is removed. As the water repellent agent, a silane coupling agent may be used.

3 Claims, 1 Drawing Sheet

(56) References Cited

U.S. PATENT DOCUMENTS

| | | |
|---|---|---|
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,463,474 B2 | 12/2008 | Ritter et al. |
| 2005/0046536 A1 | 3/2005 | Ritter et al. |
| 2007/0014075 A1 | 1/2007 | Ritter et al. |
| 2007/0201183 A1* | 8/2007 | Komatsu ............... H01G 4/2325 361/311 |
| 2008/0063877 A1* | 3/2008 | Ukuma ................ H01G 4/2325 428/433 |
| 2008/0123248 A1 | 5/2008 | Kunishi et al. |
| 2008/0123249 A1 | 5/2008 | Kunishi et al. |
| 2008/0151470 A1* | 6/2008 | Motoki et al. ................ 361/303 |
| 2008/0158774 A1 | 7/2008 | Trinh |
| 2009/0052114 A1* | 2/2009 | Motoki et al. ............. 361/306.3 |

FOREIGN PATENT DOCUMENTS

| | | |
|---|---|---|
| JP | 2006-57042 A | 3/2006 |
| JP | 2008-235698 | * 10/2008 |

OTHER PUBLICATIONS

Motoki et al., "Laminated Electronic Component and Method for Manufacturing the Same", U.S. Appl. No. 12/043,225, filed Mar. 6, 2008.

Motoki et al., "Laminated Electronic Component and Manufacturing Method Therefor", U.S. Appl. No. 12/781,058, filed May 17, 2010.

Ogawa et al., "Laminated Electronic Component and Manufacturing Method Therefor", U.S. Appl. No. 12/788,340, filed May 27, 2010.

Saruban et al., "Laminated Electronic Component and Manufacturing Method Therefor", U.S. Appl. No. 13/020,886, filed Feb. 4, 2011.

Saito et al., "Method for Producing Ceramic Electronic Component", U.S. Appl. No. 13/105,926, filed May 12, 2011.

Official Communication issued in corresponding Japanese Patent Application No. 2011-099123, mailed on Oct. 7, 2014.

* cited by examiner

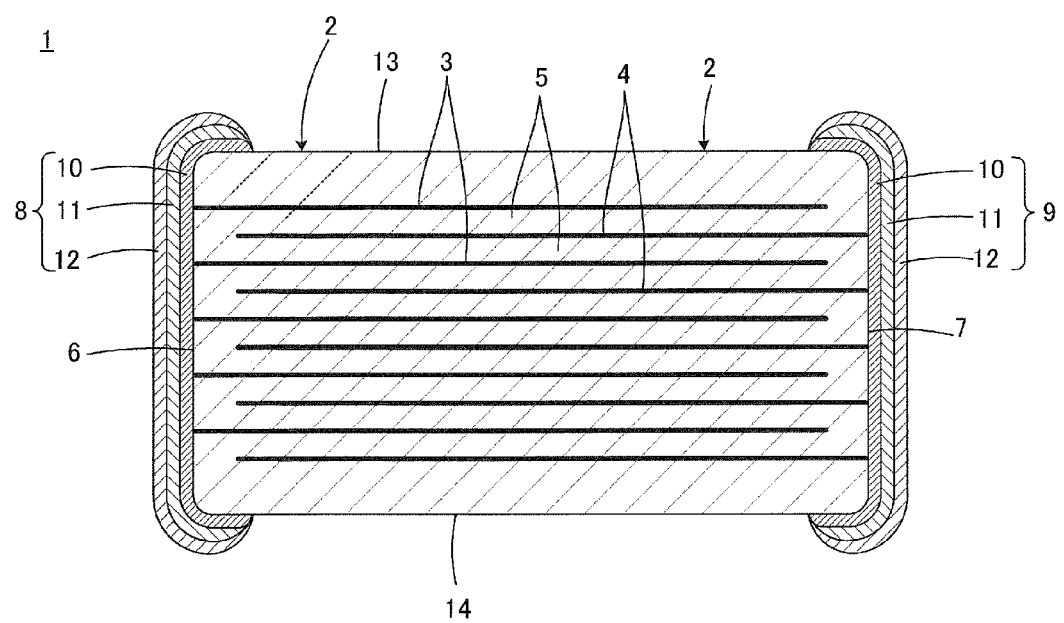

METHOD FOR PRODUCING CERAMIC ELECTRONIC COMPONENT

BACKGROUND OF THE INVENTION

1. Field of the Invention

The present invention relates to a method for producing a ceramic electronic component, and more particularly, to a method for producing a ceramic electronic component, which includes a step of providing a component main body with water repellency in order to prevent the ingress of moisture into the ceramic electronic component.

2. Description of the Related Art

The ingress of moisture into a void section of a ceramic electronic component causes degradation of reliability, such as electrical insulation and lifetime characteristics. The ingress of moisture is likely to occur, for example, during a plating process which is performed to form external terminal electrodes and during use in a high-humidity environment. In particular, in a laminated ceramic electronic component including a component main body which has a laminated structure, the ingress of moisture is likely to occur through gaps at the interfaces between internal electrodes and ceramic layers. In this case, even when external terminal electrodes are formed on the outer surface of the component main body so as to be electrically connected to the internal electrodes, with the result that the interfaces between the internal electrodes and the ceramic layers are covered with the external electrodes, the ingress of moisture may be caused due to various voids and gaps. In particular, when the external terminal electrodes are formed only by plating, the ingress of moisture is more likely to occur.

As methods for preventing the ingress of moisture as described above, methods for providing a water repellent agent (which may be referred to as a "waterproof agent" in some cases) have been proposed.

For example, the techniques described in Japanese Patent No. 3304798 and Japanese Patent No. 3444291 are intended to prevent the ingress of moisture by forming a water repellent film on the surface of a ceramic body or on the surfaces of external electrodes before performing a plating process on the external electrodes. It is to be noted that, in Japanese Patent No. 3304798 and Japanese Patent No. 3444291, the water repellent film is formed by immersing the ceramic body with the external electrodes formed thereon in a water repellent agent under atmospheric pressure or under reduced pressure in a vacuum.

On the other hand, a technique described in Japanese Patent No. 4167360 is intended to prevent the ingress of moisture by performing a plating process onto external electrodes and then impregnating a porous section of the surface and inside of the external terminal electrodes with a water repellent member. In this case, a chip subjected to a plating process is immersed in the water repellent member under reduced pressure in a vacuum in the step of impregnating the porous section with the water repellent member. In addition, as described in Japanese Patent No. 4167360, the water repellent member is removed from the surface of the external terminal electrodes in order not to damage the appearance or the wettability.

As described above, the impregnation with the water repellent agent is performed under atmospheric pressure or under reduced pressure in a vacuum in the techniques described in Japanese Patent No. 3304798, Japanese Patent No. 3444291, and Japanese Patent No. 4167360. However, the simple impregnation under atmospheric pressure or under reduced pressure in a vacuum may fail to cause the water repellent agent to sufficiently penetrate deeply into minute voids, thereby resulting in an insufficient water repellent effect and, thus, degrade reliability.

In addition, as in the case of the techniques described in Japanese Patent No. 3304798 and Japanese Patent No. 3444291, when a step of removing the water repellent film is not performed after the formation of the water repellent film on the surface of the ceramic body and the surface of the external electrodes, the excessively high water repellent ability of the water repellent agent may cause problems such as defective film deposition or defective film adhesion in a subsequent plating process. However, conversely, when emphasis is placed on the prevention of the problem in the plating process and the water repellent agent used has a reduced water repellent ability reduced, the essential effect of preventing ingress of moisture will not be sufficiently produced. For these reasons, the techniques described in Japanese Patent No. 3304798 and Japanese Patent No. 3444291 are significantly limited in terms of the selection of the water repellent agent and the conditions for the impregnation.

On the other hand, when a step of removing the water repellent member is performed after the impregnation with the water repellent member as in the technique described in Japanese Patent No. 4167360, the insufficient removal may cause problems in terms of appearance and soldering properties, whereas the excessive removal will fail to provide the essential effect of preventing ingress of moisture sufficiently. For these reasons, the technique described in Japanese Patent No. 4167360 is also significantly limited in terms of the selection of the water repellent member and the conditions for the impregnation, and further significantly limited in terms of the conditions for the removal.

SUMMARY OF THE INVENTION

Preferred embodiments of the present invention provide a method for producing a ceramic electronic component, which overcomes the problems described above.

A method for producing a ceramic electronic component according to a preferred embodiment of the present invention preferably includes the steps of preparing a component main body made of a ceramic, forming an external terminal electrode on an outer surface of the component main body, and providing at least the component main body with water repellency using of a water repellent agent. In order to solve the problems described above, in the step of providing water repellency, a step is preferably performed in which at least the component main body is provided with water repellency using a water repellent agent that is dissolved in a supercritical fluid as a solvent.

It is to be noted that in preferred embodiments of the present invention, the time to perform the step of providing water repellency is not particularly limited. More specifically, the step of providing water repellency may be performed at any time before and after the step of forming an external terminal electrode, or even in the process of the step of forming an external terminal electrode when the step of forming an external terminal electrode includes multiple steps such as, for example, a firing (or curing) step and a plating step. Furthermore, the step of providing water repellency may preferably be performed more than once.

In addition, a known $CO_2$ supercritical fluid, for example, is preferably used as the supercritical fluid.

Preferably, the production method according to a preferred embodiment of the present invention is advantageously applied to a ceramic electronic component which includes a component main body including a laminated structure including a plurality of stacked ceramic layers and a plurality of internal electrodes provided along specific interfaces between the ceramic layers and being partially exposed. In this case, the step of forming an external terminal electrode preferably includes a step of forming the external terminal electrode on the outer surface of the component main body so as to be electrically connected to the internal electrodes.

Preferably, the supercritical fluid is highly diffusive, superior in penetration, and highly soluble. Therefore, the water repellent agent dissolved in the supercritical fluid can easily penetrate deeply into minute nano-level voids.

Therefore, according to various preferred embodiments of the present invention, this step enables the water repellent agent to sufficiently penetrate deeply into minute nano-level voids in the ceramic electronic component. As a result, the ceramic electronic component produces a sufficient water repellent (waterproof) effect, thereby significantly improving the reliability of the ceramic electronic component, such as electrical insulation or lifetime characteristics.

The method according to another preferred embodiment of the present invention, preferably further includes a step of removing the water repellent agent on at least the outer surface of the component main body after the step of providing water repellency, such that the water repellent agent is prevented from interfering with platability or solderability. In addition, regardless of the removal, the component main body is impregnated with the water repellent agent not only at the surface but also deeply therein, and thus, maintains a sufficient water repellent effect. Therefore, a water repellent agent which has a stronger water repellent ability is effectively provided.

When the step of forming an external terminal electrode includes a step of forming a plating film, the water repellent agent effectively prevents the ingress of a plating solution into the component main body as long as the step of forming a plating film is performed after the step of providing water repellency.

In a preferred embodiment of the present invention, the step of removing the water repellent agent on at least the surface on which a plating film is to be formed is preferably performed before the step of forming a plating film and after the step of providing water repellency, so as to prevent defective adhesion of a plating film, even when a water repellent agent having a stronger water repellent ability is used.

When the step of providing water repellency is performed before the step of forming an external terminal electrode, that is, with no electrode formed on the component main body, the water repellent agent easily penetrates more deeply into the component main body.

When the ceramic electronic component includes a component main body which has the laminated structure as described above, the penetration of the water repellent agent into the interfaces between the ceramic layers and the internal electrodes effectively prevents the ingress of moisture into the component main body, and thus, improve the reliability, such as electrical insulation and lifetime characteristics, thereof.

When the step of providing water repellency is performed before the step of forming an external terminal electrode as described above, the water repellent agent is more likely to penetrate into the interfaces between the ceramic layers and the internal electrodes, and high reliability, such as sufficient electrical insulation and lifetime characteristics, is achieved even when a laminated ceramic electronic component includes ceramic layers having an extremely reduced thickness.

When the water repellent agent includes a silane coupling agent, water repellency is produced by dehydration and condensation at both the ceramic surface and the surface of an oxide film of the metal section, because the silane coupling agent has both an organic functional group and a hydrolyzable group.

The above and other elements, features, steps, characteristics and advantages of the present invention will become more apparent from the following detailed description of the preferred embodiments with reference to the attached drawings.

BRIEF DESCRIPTION OF THE DRAWINGS

The FIGURE is a cross-sectional view illustrating a laminated ceramic electronic component 1 produced by a method according to a preferred embodiment of the present invention.

DETAILED DESCRIPTION OF THE PREFERRED EMBODIMENT

Referring to the FIGURE, a ceramic electronic component 1 preferably includes a component main body 2 having a laminated structure. The component main body 2 preferably includes a plurality of internal electrodes 3 and 4 provided therein. More specifically, the component main body 2 preferably includes a plurality of stacked ceramic layers 5, and a plurality of layered internal electrodes 3 and 4 disposed along the interfaces between the ceramic layers 5.

When the ceramic electronic component 1 defines a laminated ceramic capacitor, the ceramic layers 5 are preferably made of a dielectric ceramic, for example. It is to be noted that the ceramic electronic component 1 may define other components, such as inductors, thermistors, and piezoelectric components. Therefore, depending on the function of the ceramic electronic component 1, the ceramic layers 5 may preferably be composed of a magnetic ceramic, a semiconductor ceramic, and a piezoelectric ceramic, for example, in addition to a dielectric ceramic.

The ends of the plurality of internal electrodes 3 and the ends of the plurality of internal electrodes 4 are respectively exposed at end surfaces 6 and 7 of the component main body 2, and external terminal electrodes 8 and 9 are respectively provided so that the ends of the internal electrodes and the ends of the internal electrodes 4 are electrically connected to each other.

It is to be noted that while the ceramic electronic component 1 is a two-terminal component including the two external terminal electrodes 8 and 9, preferred embodiments of the present invention can be also applied to multi-terminal ceramic electronic components.

Each of the external terminal electrodes 8 and 9 preferably includes, for example, a first electrode layer 10 formed on the exposed surfaces of the internal electrodes 3 and 4 in the component main body 2, that is, on the end surfaces 6 and 7, a second electrode layer 11 formed thereon, and a third electrode layer 12 formed thereon. The first to third electrode layers 10 to 12 provide the following functions.

The first electrode layer 10 electrically connects the plurality of internal electrodes 3 or the plurality of internal electrodes 4 to each other, and preferably includes a highly conductive metal, such as copper, for example, as its main component. On the other hand, the second and third electrode layers 11 and 12 provide and/or improve the mountability of the ceramic electronic component 1. More specifically, the second electrode layer 11 provides the external terminal electrodes 8 and 9 with a solder barrier property, and preferably includes, for example, nickel as its main component. The third electrode layer 12 provides the external terminal electrodes 8 and 9 with solderability, and preferably includes, for example, tin or gold as its main component.

It is to be noted that each of the external terminal electrodes 8 and 9 may include four or more layers, or may include one or two layers, as opposed to the first to third electrode layers 10 to 12 as described above.

Next, a method for producing the ceramic electronic component 1, and in particular, a method for forming the external terminal electrodes 8 and 9 will be described.

First, the component main body 2 is produced in accordance with a well-known method. Next, the external terminal electrodes 8 and 9 are formed on the end surfaces 6 and 7 of the component main body 2 so as to be electrically connected to the internal electrodes 3 and 4, respectively. In this case, the step of forming the first electrode layer 10, the step of forming the second electrode layer 11, and the step of forming the third electrode layer 12 are preferably sequentially performed in the step of forming the external terminal electrodes 8 and 9.

Among the first to third electrode layers 10 to 12, the second and third electrode layers 11 and 12 are preferably formed by an electroless plating method of depositing metal ions with the use of a reducing agent, or an electrolytic plating method through a process of applying an electric current, for example.

On the other hand, the first electrode layer 10 may preferably be formed by the electroless plating method or electrolytic plating method described above, by applying and firing a conductive paste, by applying and curing a conductive resin, or by a thin film formation method such as sputtering, for example.

A case of forming the first electrode layer 10 by plating will be described in more detail. First, in the component main body 2 before performing plating, the plurality of internal electrodes 3 exposed at the one end surface 6 are electrically insulated from each other, and the plurality of internal electrodes 4 exposed at the other end surface 7 are electrically insulated from each other. For the formation of the first electrode layer 10, preferably, metal ions in a plating solution are first deposited on the exposed sections of the respective internal electrodes 3 and 4. Then, the plated depositions are further grown to physically connect the plated depositions on the respective exposed sections of the adjacent internal electrodes 3 and the plated depositions on the respective exposed sections of the adjacent internal electrodes 4. In this manner, the first electrode layer 10 is formed so as to be homogeneous and dense.

When the first electrode layer 10 described above is made of a plating film including, as its main component, copper, for example, which provides favorable throwing power, the efficiency of the plating process is increased, and the fixing strength of the external terminal electrodes 8 and 9 us also increased.

It is to be noted that as shown in the FIGURE, the first electrode layer 10 is preferably formed on the pair of end surfaces 6 and 7 of the component main body 2 so that the end edges of the first electrode layers 10 are located on a pair of principal surfaces 13 and 14 and a pair of side surfaces, which are adjacent to the end surfaces 6 and 7 of the component main body 2. In order to enable the first electrode layers 10 to be efficiently formed, dummy conductors which provide no substantial contribution to the development of electrical properties may preferably be formed so as to be exposed near both ends of the component main body 2 in the stacking direction to promote the plating growth such that metal ions for the formation of the first electrode layers 10 are deposited on the dummy conductors.

In addition, before the plating step described above, the end surfaces 6 and 7 of the component main body 2 are preferably subjected to a polishing treatment in order to sufficiently expose the internal electrodes 3 and 4 as well as the dummy conductors at the end surfaces 6 and 7.

As described above, when the first electrode layer 10 is formed by plating, a heat treatment is preferably performed after the plate processing. This heat treatment forms an interdiffusion layer between each of the internal electrodes 3 and 4 and the first electrode layer 10. This formation of the interdiffusion layer also prevents ingress of moisture into the component main body 2.

In addition, in the present preferred embodiment, a step is preferably performed in which a water repellent agent is used to provide at least the component main body 2 with water repellency. In this case, the water repellent agent is preferably dissolved in a supercritical fluid such as, for example, a supercritical $CO_2$ fluid as a solvent. More specifically, in order to provide the water repellent agent, the water repellent agent is dissolved in a supercritical fluid by encapsulating the water repellent agent and one of the component main body 2 and the ceramic electronic component 1 in a pressure vessel, and introducing a liquid to function as a supercritical fluid into the pressure vessel while adding additional pressure to the liquid with a pump, thereby increasing the temperature and the pressure. Then, the water repellent agent dissolved in the supercritical fluid is maintained for a predetermined period of time to cause the water repellent agent to penetrate into minute voids of the component main body 2 or the ceramic electronic component 1. Then, preferably, the component main body 2 or the ceramic electronic component 1 is removed from the pressure vessel, dried, and then subjected to a heat treatment. In this manner, the step of providing water repellency is completed.

The supercritical fluid used in the step of providing water repellency is preferably highly diffusive, superior in penetration, and highly soluble, for example. Therefore, the water repellent agent dissolved in the supercritical fluid can easily penetrate deeply into minute nano-level voids. Accordingly, this step enables the water repellent agent to sufficiently penetrate deeply into minute nano-level voids present in the component main body 2 or the ceramic electronic component 1. As a result, the component main body 2 or the ceramic electronic component 1 has a sufficient water repellent effect, thereby enabling the reliability of the ceramic electronic component 1, such as electrical insulation or lifetime characteristics, to be significantly improved.

The time at which the step of providing water repellency is performed is not particularly limited. More specifically, the step of providing water repellency may preferable be performed before or after the step of forming an external terminal electrode, or during the step of forming an external terminal electrode, for example, between the step of forming the first electrode layer 10 and the step of forming the second electrode layer 11. Therefore, as described above, the component main body 2 encapsulated in the pressure vessel may include at least a portion of the external terminal electrodes 8 and 9 already formed thereon. In addition, the step of providing water repellency may preferably be performed more than once.

When the step of forming the external terminal electrodes 8 and 9 includes a step of forming a plating film, the water repellent agent effectively prevents the ingress of a plating solution into the component main body 2 as long as the step of forming a plating film is performed after the step of providing water repellency.

In addition, when the step of providing water repellency is performed before the step of forming an external terminal electrode, that is, with no electrode formed on the component main body 2, the water repellent agent can easily penetrate more deeply into the component main body 2. Here, when the component main body 2 has a laminated structure as in the present preferred embodiment, the penetration of the water repellent agent into the interfaces between the ceramic layers 5 and the internal electrodes 3 and 4 prevents the ingress of moisture into the component main body 2, and thus, improves the reliability, such as electrical insulation and lifetime characteristics. In particular, when the step of providing water repellency is performed before the step of forming an external terminal electrode as described above, the water repellent agent is more likely to penetrate into the interfaces between the ceramic layers 5 and the internal electrodes 3 and 4, and high reliability, such as sufficient electrical insulation and lifetime characteristics, is effectively achieved, even if the ceramic layers 5 between the internal electrodes 3 and 4 have a reduced thickness.

As the water repellent agent used in the step of providing water repellency, an organosilicon compound (silane coupling agent) which has both an organic functional group and a hydrolyzable group is preferable. The silane coupling agent provides water repellency by dehydration and condensation at the ceramic surface and the surface of an oxide film of the metal section.

The hydrolysis reaction of the silane coupling agent is developed by the addition of moisture to the silane coupling agent or by moisture adsorbed on the surface to be treated. In order to accelerate the hydrolysis reaction of the silane coupling agent, alcohol or other suitable agent in which water is likely to be dissolved may preferably be used along with the silane coupling agent.

To improve the solubility of the water repellent agent in a supercritical fluid, and to accelerate the hydrolysis reaction of, in particular, a silane coupling agent as the water repellent agent, it is also preferable to use co-solvents, i.e., alcohols.

In addition, after the step of providing water repellency, a step of removing the water repellent agent on at least the outer surface of the component main body 2 is performed, if necessary. This removal step preferably utilizes, for example, a wet removal step (chemical removal step) involving a dissolution treatment, or a dry removal step (mechanical removal step) involving a barrel treatment or a blast treatment.

As described above, the removal step prevents the water repellent agent from interfering with platability and solderability. In addition, regardless of the removal, the component main body 2 is impregnated with the water repellent agent not only at the surface but also deeply therein, and thus, maintains a sufficient water repellent effect. Therefore, a water repellent agent which has a stronger water repellent ability can be used without problems.

In particular, a step of removing the water repellent agent on at least the surface on which a plating film is to be formed before the plating step after the step of providing water repellency reduces the likelihood of defective adhesion of a plating film, even when using a water repellent agent having a stronger water repellent ability.

In addition, after a supercritical fluid is applied to provide a water repellent agent, the water repellent agent may be further provided by normal immersion or vacuum impregnation. This is because the method using a supercritical fluid is useful for penetration into minute pores in a ceramic body, whereas the latter conventional immersion or vacuum impregnation may be preferable for pores with relatively large diameters on the outermost surface.

Next, experimental examples will be described which were performed to confirm the advantageous effects of the present invention.

Experimental Example 1

In Experimental Example 1, the step of providing water repellency was performed, during the process of forming the external terminal electrodes, that is, before a plating process and after a thick film was formed by firing a conductive paste.

A component main body of laminated structure for a laminated ceramic capacitor was prepared, which included ceramic layers made of a barium titanate based dielectric material and Ni internal electrodes, with a Cu thick film formed by firing a conductive paste as a first electrode layer for the external terminal electrode. The component main body had external dimensions of about 2.0 mm×about 1.25 mm×about 1.25 mm. In addition, the thickness of the ceramic layer was about 1 μm between adjacent internal electrodes.

On the other hand, three types of silane coupling agents H, M, and L shown in Table 1 below were prepared as water repellent agents.

TABLE 1

| Silane Coupling Agent Symbol | Water Repellent Ability | Composition and Name |
|---|---|---|
| H | High | $CF_3-CH_2-CH_2-Si(OCH_3)_3$ Trifluoropropyl trimethoxysilane |
| M | Middle | $CH_3-(CH_2)_9-Si(OCH_3)_3$ Decyl trimethoxysilane |
| L | Low | $(ClCH_2-CH_2-CH_2-Si(OCH_3)_3$ 3-Chloropropyl trimethoxysilane |

Next, for samples 1 to 6 as examples of preferred embodiments of the present invention, the silane coupling agent shown in the column "Silane Coupling Agent" in Table 2 was selected from among the three types of silane coupling agents H, M, and L shown in Table 1, about 1.5 ml of the selected silane coupling agent and the component main body were encapsulated in a pressure vessel having an inner volume of about 50 ml for supercritical treatment, liquid $CO_2$ was introduced into the pressure vessel while adding additional pressure to the liquid $CO_2$ with a pump, so that the water repellent agent in the supercritical fluid had a concentration of about 3 volume %, and the temperature and the pressure were increased until reaching a temperature of about 40° C. and a pressure of about 25 MPa, thereby dissolving the water repellent agent in the supercritical $CO_2$.

Then, the water repellent agent dissolved in the supercritical fluid was maintained for about 3 hours to cause the water repellent agent to penetrate into minute voids of the component main body. Then, the component main body was removed from the pressure vessel.

Next, for samples 1 to 3, the component main body removed from the pressure vessel was dried, and then subjected to a heat treatment at a temperature of about 150° C. for about 30 minutes. In addition, for samples 4 to 6, in order to confirm the effect of the step of removing the water repellent agent after the water repellent treatment, the component main body removed from the pressure vessel was immersed in isopropyl alcohol for about 30 seconds before drying to remove the water repellent agent on the surface, and then subjected to a heat treatment at a temperature of about 150° C. for about 30 minutes.

On the other hand, for samples 7 to 12 as comparative examples as shown in Table 2, the silane coupling agent shown in the column "Silane Coupling Agent" in Table 2 was selected from among the three types of silane coupling agents H, M, and L shown in Table 1, the selected silane coupling agent was dissolved in isopropyl alcohol so as to be about 3 volume %, the component main body immersed in the solution of the silane coupling agent was maintained at a temperature of about 40° C. for about 3 hours, thereby causing the water repellent agent to penetrate into the component main body. Then, the component main body was removed from the solution of the silane coupling agent.

Next, for samples 7 to 9, the component main body removed from the pressure vessel was dried, and then subjected to a heat treatment at a temperature of about 150° C. for about 30 minutes. In addition, for samples 10 to 12, in order to confirm the effect of the step of removing the water repellent agent after the water repellent treatment, the component main body removed from the solution of the silane coupling agent was immersed in isopropyl alcohol for about 30 seconds before drying to remove the water repellent agent on the surface, and then subjected to a heat treatment at a temperature of about 150° C. for about 30 minutes.

In addition, the treatment for providing water repellency was not performed for sample 13 as a comparative example, shown in Table 2.

Next, for all of samples 1 to 13, a Ni plating film as a second electrode layer and a Sn plating film as a third electrode layer were formed sequentially by electrolytic plating on the first electrode layer made of a Cu thick film to obtain laminated ceramic capacitors as samples.

The laminated ceramic capacitors according to each sample were evaluated for the formation of plating film, and subjected to a moisture resistance loading test, as shown in Table 2. For each evaluation item, the number of samples was 100 for each sample number. More specifically, regarding the formation of the plating film, a sample having defective adhesion was determined as being defective by microscopic observation, and the number of defective samples was counted. In addition, in the moisture resistance loading test, a direct-current voltage of about 10V was applied for about 144 hours in an environment with a temperature of about 125° C. and a relative humidity of about 95%, a sample having insulation resistance value after the test less than about 1 MΩ was determined to be defective, and the number of defective samples was counted.

TABLE 2

| Sample Number | Water Repellent Treatment | Removal Step | Silane Coupling Agent | Number of Defectives in Formation of Plating Film | Number of Defectives in Moisture Resistance Loading Test |
|---|---|---|---|---|---|
| 1 | Supercritical state | Absence | H | 24/100 | 0/100 |
| 2 | Supercritical state | Absence | M | 0/100 | 0/100 |
| 3 | Supercritical state | Absence | L | 0/100 | 0/100 |
| 4 | Supercritical state | Presence | H | 0/100 | 0/100 |
| 5 | Supercritical state | Presence | M | 0/100 | 0/100 |
| 6 | Supercritical state | Presence | L | 0/100 | 0/100 |
| 7 | Normal immersion | Absence | H | 25/100 | 0/100 |
| 8 | Normal immersion | Absence | M | 12/100 | 2/100 |
| 9 | Normal immersion | Absence | L | 0/100 | 4/100 |
| 10 | Normal immersion | Presence | H | 0/100 | 4/100 |
| 11 | Normal immersion | Presence | M | 0/100 | 3/100 |
| 12 | Normal immersion | Presence | L | 0/100 | 4/100 |
| 13 | No treatment | — | — | 0/100 | 12/100 |

A discussion is provided below based on the absence or presence of the step of removing the water repellent agent.

When a comparison is made among samples 7 to 9 which employed normal immersion in the water repellent treatment, the use of the silane coupling agent with a higher water repellent ability caused defective samples in the formation of the plating film, whereas the use of the silane coupling agent with a lower water repellent ability caused defective samples in the moisture resistance loading test. From this result, it was determined that it is difficult to achieve a balance between the formation of a plating film and the moisture resistance loading test in the case of samples 7 to 9 employing normal immersion in the water repellent treatment.

In contrast to samples 7 to 9, when a comparison is made among samples 1 to 3 which employed a supercritical state in the water repellent treatment, as in the case of samples 2 and 3, the use of the silane coupling agent with a relatively low water repellent ability caused no defective samples in the moisture resistance loading test, and furthermore, caused no defective samples in the formation of the plating film, thus effectively providing a balance between the formation of the plating film and the moisture resistance loading test. This is assumed to be because the water repellent agent penetrates more deeply.

It is to be noted that the use of the silane coupling agent with a higher water repellent ability as in the case of sample 1 caused defective samples in the formation of the plating film. This problem is overcome by performing the step of removing the water repellent agent as described below.

For samples 10 to 12 which employed normal immersion in the water repellent treatment, the treatment for removing the water repellent agent decreased the water repellent ability at the surface, thereby causing defective samples in the moisture resistance loading test.

In contrast to samples 10 to 12, for samples 4 to 6 which employed a supercritical state in the water repellent treatment, the treatment for removing the water repellent treatment caused no defective samples in the moisture resistance loading test, and furthermore, caused no defective samples in the formation of the plating film, thus effectively providing a balance between the formation of the plating film and the moisture resistance loading test. This is assumed to be because the water repellent agent penetrates more deeply, thereby preventing the internal ingress of moisture even after the removal step.

It is to be noted that while the use of the silane coupling agent with a higher water repellent ability without the removal step caused defective samples in the formation of the plating film as in the case of sample 1 described above, the use of the silane coupling agent with a higher water repellent ability caused no defective samples in the formation of the plating film for sample 4 because the removal step was performed. From this result, it was determined that it is effective to perform the step of removing the water repellent agent when using the silane coupling agent with a higher water repellent ability.

For sample 13 without the water repellent treatment, no defective samples were produced in the formation of the plating film, whereas many samples were defective in the moisture resistance loading test.

Experimental Example 2

In Experimental Example 2, the step of providing water repellency was performed after the formation of the external terminal electrodes, that is, after a plating process.

As in the component main body prepared in Experimental Example 1 for a laminated ceramic capacitor, more specifically, a component main body of laminated structure for a laminated ceramic capacitor was prepared, which included ceramic layers made of a barium titanate based dielectric material Ni internal electrodes, with a Cu thick film formed by firing a conductive paste as a first electrode layer for the external terminal electrode.

Next, a Ni plating film as a second electrode layer and a Sn plating film as a third electrode layer were formed sequentially by electrolytic plating on the first electrode layer made of a Cu thick film to obtain laminated ceramic capacitors.

On the other hand, the three types of silane coupling agents H, M, and L shown in Table 1 above were also prepared as water repellent agents in Experiment Example 2.

Next, for samples 21 to 26 as examples of preferred embodiments of the present invention, the silane coupling agent shown in the column "Silane Coupling Agent" in Table 3 was selected from among the three types of silane coupling agents H, M, and L shown in Table 1, about 1.5 ml of the selected silane coupling agent and the laminated ceramic capacitor was encapsulated in a pressure vessel having an inner volume of about 50 ml for supercritical treatment, liquid $CO_2$ was introduced into the pressure vessel while adding additional pressure to the liquid $CO_2$ with a pump, so that the water repellent agent in the supercritical fluid had a concentration of about 3 volume %, and the temperature and the pressure were increased until reaching a temperature of about 40° C. and a pressure of about 25 MPa, thereby dissolving the water repellent agent in the supercritical $CO_2$.

Then, the water repellent agent dissolved in the supercritical fluid was maintained for about 3 hours to cause the water repellent agent to penetrate into minute voids of the laminated ceramic capacitor. Then, the laminated ceramic capacitor was removed from the pressure vessel.

Next, for samples 21 to 23, the laminated ceramic capacitor removed from the pressure vessel was dried, and then subjected to a heat treatment at a temperature of about 150° C. for about 30 minutes. In addition, for samples 24 to 26, in order to confirm the effect of the step of removing the water repellent agent after the water repellent treatment, the laminated ceramic capacitor removed from the pressure vessel was immersed in isopropyl alcohol for about 30 seconds before drying to remove the water repellent agent on the surface, and then subjected to a heat treatment at a temperature of about 150° C. for about 30 minutes.

On the other hand, for samples 27 to 32 as comparative examples as shown in Table 3, the silane coupling agent shown in the column "Silane Coupling Agent" in Table 3 was selected from among the three types of silane coupling agents H, M, and L shown in Table 1, the selected silane coupling agent was dissolved in isopropyl alcohol so as to be about 3 volume %, the laminated ceramic capacitor immersed in the solution of the silane coupling agent was maintained at a temperature of about 40° C. for about 3 hours, thereby causing the water repellent agent to penetrate into the laminated ceramic capacitor. Then, the laminated ceramic capacitor was removed from the solution of the silane coupling agent.

Next, for samples 27 to 29, the laminated ceramic capacitor removed from the pressure vessel was dried, and then subjected to a heat treatment at a temperature of about 150° C. for about 30 minutes. In addition, for samples 30 to 32, in order to confirm the effect of the step of removing the water repellent agent after the water repellent treatment, the laminated ceramic capacitor removed from the solution of the silane coupling agent was immersed in isopropyl alcohol for about 30 seconds before drying to remove the water repellent agent on the surface, and then subjected to a heat treatment at a temperature of about 150° C. for about 30 minutes.

In addition, the treatment for providing water repellency was not performed for sample 33 as a comparative example, shown in Table 3. It is to be noted that sample 33 was produced under the same conditions as for sample 13 in Experimental Example 1.

The laminated ceramic capacitors according to each sample were evaluated for the soldering property, and subjected to a moisture resistance loading test, as shown in Table 3. For each evaluation item, the number of samples was 100 for each sample number. More specifically, for the qualitative evaluation of the solderability, the laminated ceramic capacitor was immersed in molten solder in accordance with the test condition specified in JIS C 60068-2-58 (2006), and then evaluated by microscopic observation for an external terminal electrode covered with solder, the sample with its solder coverage less than about 90% at the surface of the external terminal electrode was determined to be a defective sample, and the number of defective samples was calculated. In addition, the evaluations in the moisture resistance loading test were made in the same manner as in Experimental Example 1.

TABLE 3

| Sample Number | Water Repellent Treatment | Removal Step | Silane Coupling Agent | Number of Defectives in Soldering Property | Number of Defectives in Moisture Resistance Loading Test |
|---|---|---|---|---|---|
| 21 | Supercritical state | Absence | H | 30/100 | 0/100 |

TABLE 3-continued

| Sample Number | Water Repellent Treatment | Removal Step | Silane Coupling Agent | Number of Defectives in Soldering Property | Number of Defectives in Moisture Resistance Loading Test |
|---|---|---|---|---|---|
| 22 | Supercritical state | Absence | M | 0/100 | 0/100 |
| 23 | Supercritical state | Absence | L | 0/100 | 0/100 |
| 24 | Supercritical state | Presence | H | 0/100 | 0/100 |
| 25 | Supercritical state | Presence | M | 0/100 | 0/100 |
| 26 | Supercritical state | Presence | L | 0/100 | 0/100 |
| 27 | Normal immersion | Absence | H | 33/100 | 0/100 |
| 28 | Normal immersion | Absence | M | 21/100 | 4/100 |
| 29 | Normal immersion | Absence | L | 0/100 | 7/100 |
| 30 | Normal immersion | Presence | H | 0/100 | 7/100 |
| 31 | Normal immersion | Presence | M | 0/100 | 7/100 |
| 32 | Normal immersion | Presence | L | 0/100 | 6/100 |
| 33 | No treatment | — | — | 0/100 | 12/100 |

A discussion is provided below regarding the absence or presence of the step of removing the water repellent agent.

When a comparison is made among samples 27 to 29 which employed normal immersion in the water repellent treatment, the use of the silane coupling agent with a higher water repellent ability caused defective sample in soldering property, whereas the use of the silane coupling agent with a lower water repellent ability caused defective samples in the moisture resistance loading test. From this result, it was determined that it is difficult to achieve a balance between the soldering property and the moisture resistance loading test in the samples 27 to 29 which employed normal immersion in the water repellent treatment.

In contrast to samples 27 to 29, when a comparison is made among samples 21 to 23 which employed a supercritical state in the water repellent treatment, as in the case of samples 22 and 23, the use of the silane coupling agent with a relatively low water repellent ability caused no defective samples in the moisture resistance loading test, and furthermore, caused no defective samples in soldering property, thus providing a balance between the soldering property and the moisture resistance loading test. This is assumed to be because the water repellent agent penetrates more deeply.

It is to be noted that the use of the silane coupling agent with a higher water repellent ability as in the case of sample 21 caused defective samples in soldering property. This problem is overcome by performing the step of removing the water repellent agent as described below.

For samples 30 to 32 which employed normal immersion in the water repellent treatment, the treatment for removing the water repellent agent decreased the water repellent ability at the surface, thereby causing defective samples in the moisture resistance loading test.

In contrast to these samples, for samples 24 to 26 which employed a supercritical state in the water repellent treatment, the treatment for removing the water repellent agent caused no defective samples in the moisture resistance loading test, and furthermore, caused no defective samples in soldering property, thus providing a balance between the soldering property and the moisture resistance loading test. This is assumed to be because the water repellent agent penetrates more deeply, thereby preventing the internal ingress of moisture even after the removal step.

It is to be noted that while the use of the silane coupling agent with a higher water repellent ability without the removal step caused defective samples in soldering property as in the case of sample 21 described above, the use of the silane coupling agent with a higher water repellent ability caused no defective samples in soldering property for sample 24 because the removal step was performed. From this result, it was determined that it is effective to perform the step of removing the water repellent agent when the silane coupling agent with a higher water repellent ability is used.

Since sample 33 without the water repellent treatment was produced under the same condition as for sample 13 in Experimental Example 1 as described previously, the same numerical values as shown in Table 2 are indicated for the number of defective samples in soldering property and the number of defect samples in the moisture resistance loading test.

Experimental Example 3

In Experimental Example 3, the step of providing water repellency was performed before the formation of the external terminal electrodes.

A component main body having laminated structure for a laminated ceramic capacitor was prepared, which included ceramic layers made of a barium titanate based dielectric material and Ni internal electrodes. The component main body had external dimensions of about 1.9 mm×about 1.05 mm×about 1.05 mm. In addition, the thickness of the ceramic layer was about 1 µm between adjacent internal electrodes.

In addition, the three types of silane coupling agents H, M, and L shown in Table 1 above were also prepared as water repellent agents in Experiment Example 3.

Next, for samples 41 to 46 as examples of preferred embodiments of the present invention, the silane coupling agent shown in the column "Silane Coupling Agent" in Table 4 was selected from among the three types of silane coupling agents H, M, and L shown in Table 1, about 1.5 ml of the selected silane coupling agent and the component main body was encapsulated in a pressure vessel having an inner volume of about 50 ml for supercritical treatment, liquid $CO_2$ was introduced into the pressure vessel while adding additional pressure to the liquid $CO_2$ with a pump, so that the water repellent agent in the supercritical fluid had a concentration of about 3 volume %, and the temperature and the pressure were increased until reaching a temperature of about 40° C. and a pressure of about 25 MPa, thereby dissolving the water repellent agent in the supercritical $CO_2$.

Then, the water repellent agent dissolved in the supercritical fluid was maintained for about 3 hours to cause the water repellent agent to penetrate into minute voids of the component main body. Then, the component main body was removed from the pressure vessel.

Next, for samples 41 to 43, the component main body removed from the pressure vessel was dried, and then subjected to a heat treatment at a temperature of about 150° C. for about 30 minutes. In addition, for samples 44 to 46, in order to confirm the effect of the step of removing the water repellent agent after the water repellent treatment, the component main body removed from the pressure vessel was immersed in isopropyl alcohol for about 30 seconds before drying to remove the water repellent agent on the surface, and then subjected to a heat treatment at a temperature of about 150° C. for about 30 minutes.

On the other hand, for samples 47 to 52 as comparative examples as shown in Table 4, the silane coupling agent shown in the column "Silane Coupling Agent" in Table 4 was selected from among the three types of silane coupling agents H, M, and L shown in Table 1, the selected silane coupling agent was dissolved in isopropyl alcohol so as to be about 3 volume %, the component main body immersed in the solution of the silane coupling agent was maintained at a temperature of about 40° C. for about 3 hours, thereby causing the water repellent agent to penetrate into the component main body. Then, the component main body was removed from the solution of the silane coupling agent.

Next, for samples 47 to 49, the component main body removed from the pressure vessel was dried, and then subjected to a heat treatment at a temperature of about 150° C. for about 30 minutes. In addition, for samples 50 to 52, in order to confirm the effect of the step of removing the water repellent agent after the water repellent treatment, the component main body removed from the solution of the silane coupling agent was immersed in isopropyl alcohol for about 30 seconds before drying to remove the water repellent agent on the surface, and then subjected to a heat treatment at a temperature of about 150° C. for about 30 minutes.

In addition, the treatment for providing water repellency was not performed for sample 53 as a comparative example, shown in Table 4.

Next, for all of samples 41 to 53, a conductive resin electrode layer as a first electrode layer of the external terminal electrode was formed on the component main body, and a Ni plating film as a second electrode layer and a Sn plating film as a third electrode layer were then formed sequentially by electrolytic plating on the conductive resin electrode layer, thereby completing a laminated ceramic capacitor.

The laminated ceramic capacitors according to each sample were evaluated for the formation of the external terminal electrodes, and subjected to a moisture resistance loading test, as shown in Table 4. For each evaluation item, the number of samples was 100 for each sample number. More specifically, for evaluating the formation of the external terminal electrodes, the samples were evaluated by stereoscopic microscope under sufficient illumination, a sample with the external terminal electrodes found to have any defects, such as a pinhole, was determined as a defective sample, and the number of defective samples was counted. In addition, the evaluations in the moisture resistance loading test were made in the same manner as in Experimental Example 1.

TABLE 4

| Sample Number | Water Repellent Treatment | Removal Step | Silane Coupling Agent | Number of Defectives in Formation of External Terminal Electrodes | Number of Defectives in Moisture Resistance Loading Test |
|---|---|---|---|---|---|
| 41 | Supercritical state | Absence | H | 2/100 | 3/100 |
| 42 | Supercritical state | Absence | M | 0/100 | 0/100 |
| 43 | Supercritical state | Absence | L | 0/100 | 0/100 |
| 44 | Supercritical state | Presence | H | 0/100 | 0/100 |
| 45 | Supercritical state | Presence | M | 0/100 | 0/100 |
| 46 | Supercritical state | Presence | L | 0/100 | 0/100 |
| 47 | Normal immersion | Absence | H | 3/100 | 4/100 |
| 48 | Normal immersion | Absence | M | 0/100 | 4/100 |
| 49 | Normal immersion | Absence | L | 0/100 | 5/100 |
| 50 | Normal immersion | Presence | H | 0/100 | 18/100 |
| 51 | Normal immersion | Presence | M | 0/100 | 20/100 |
| 52 | Normal immersion | Presence | L | 0/100 | 21/100 |
| 53 | No treatment | — | — | 0/100 | 21/100 |

A discussion is provided below regarding the absence or presence of the step of removing the water repellent agent.

When a comparison is made among samples 47 to 49 which employed normal immersion in the water repellent treatment, the use of the silane coupling agent with a higher water repellent ability caused defective samples in the formation of the external terminal electrodes. In addition, for all of samples 47 to 49, defective samples were caused in the moisture resistance loading test.

In contrast to these samples, when a comparison is made among samples 41 to 43 which employed a supercritical state in the water repellent treatment, as in samples 42 and 43, the use of the silane coupling agent with a relatively low water repellent ability caused no defectives samples in the moisture resistance loading test, and furthermore, caused no defective samples in the formation of the external terminal electrodes, thus providing a balance between the formation of the external terminal electrodes and the moisture resistance loading test. This is assumed to be because the water repellent agent penetrates more deeply.

It is to be noted that the use of the silane coupling agent with a higher water repellent ability as in the case of sample 41 caused defective samples in the formation of the external terminal electrodes and defective samples in the moisture resistance loading test. This problem is overcome performing the step of removing the water repellent agent as described below.

For samples 50 to 52 which employed normal immersion in the water repellent treatment, the treatment for removing the water repellent agent decreased the water repellent ability at the surface, thereby causing defective samples in the moisture resistance loading test.

In contrast to samples 50 to 52, for samples 44 to 46 which employed a supercritical state in the water repellent treatment, the treatment for removing the water repellent agent caused no defective samples in the moisture resistance loading test, and furthermore, caused no defective samples in the formation of the external terminal electrodes, thus providing a balance between the formation of the external terminal electrodes and the moisture resistance loading test. This is assumed to be because the water repellent agent penetrates more deeply, thereby preventing the internal ingress of moisture even after the removal step.

It is to be noted that while the use of the silane coupling agent with a higher water repellent ability without the removal step caused defective samples in the formation of the external terminal electrodes and defective samples in the moisture resistance loading test as in sample 41 described above, the use of the silane coupling agent with a higher water repellent ability caused no defective samples in the formation of the external terminal electrodes and caused no defective samples in the moisture resistance loading test for sample 44 because the removal step was performed. From this result, it was determined that it is effective to perform the step of removing the water repellent agent when using the silane coupling agent with a higher water repellent ability.

For sample 53 without the water repellent treatment, no defective samples were caused in the formation of the external terminal electrodes, whereas many defective samples were caused in the moisture resistance loading test.

Experimental Example 4

In Experimental Example 4, the step of providing water repellency was performed before the formation of the external terminal electrodes as in the case of Experimental Example 3, and a step of Cu electrolytic plating was performed instead of the step of forming a conductive resin electrode layer as a first electrode layer of the external terminal electrode in Experimental Example 3.

As in the case of the component main body prepared in Experimental Example 3, a component main body for a laminated ceramic capacitor was prepared.

In addition, the three types of silane coupling agents H, M, and L shown in Table 1 above were also prepared as water repellent agents in Experiment Example 4.

Next, for samples 61 to 66 as examples of preferred embodiments of the present invention, the silane coupling agent shown in the column "Silane Coupling Agent" in Table 5 was selected from among the three types of silane coupling agents H, M, and L shown in Table 1, about 1.5 ml of the selected silane coupling agent and the component main body was encapsulated in a pressure vessel having an inner volume of about 50 ml for supercritical treatment, liquid $CO_2$ was introduced into the pressure vessel while adding additional pressure to the liquid $CO_2$ with a pump, so that the water repellent agent in the supercritical fluid had a concentration of about 3 volume %, and the temperature and the pressure were increased until reaching a temperature of about 40° C. and a pressure of about 25 MPa, thereby dissolving the water repellent agent in the supercritical $CO_2$.

Then, the water repellent agent dissolved in the supercritical fluid was maintained for about 3 hours to cause the water repellent agent to penetrate into minute voids of the component main body. Then, the component main body was taken out of the pressure vessel.

Next, for samples 61 to 63, the component main body removed from the pressure vessel was dried, and then subjected to a heat treatment at a temperature of about 150° C. for about 30 minutes. In addition, for samples 64 to 66, in order to confirm the effect of the step of removing the water repellent agent after the water repellent treatment, the component main body removed from the pressure vessel was immersed in isopropyl alcohol for about 30 seconds before drying to remove the water repellent agent on the surface, and then subjected to a heat treatment at a temperature of about 150° C. for about 30 minutes.

On the other hand, for samples 67 to 72 as comparative examples as shown in Table 5, the silane coupling agent shown in the column "Silane Coupling Agent" in Table 5 was selected from among the three types of silane coupling agents H, M, and L shown in Table 1, the selected silane coupling agent was dissolved in isopropyl alcohol so as to be about 3 volume %, the component main body immersed in the solution of the silane coupling agent was maintained at a temperature of about 40° C. for about 3 hours, thereby causing the water repellent agent to penetrate into the component main body. Then, the component main body was removed from the solution of the silane coupling agent.

Next, for samples 67 to 69, the component main body removed from the pressure vessel was dried, and then subjected to a heat treatment at a temperature of about 150° C. for about 30 minutes. In addition, for samples 70 to 72, in order to confirm the effect of the step of removing the water repellent agent after the water repellent treatment, the component main body removed from the solution of the silane coupling agent was immersed in isopropyl alcohol for about 30 seconds before drying to remove the water repellent agent on the surface, and then subjected to a heat treatment at a temperature of about 150° C. for about 30 minutes. In addition, the treatment for providing water repellency was not performed for sample 73 as a comparative example, shown in Table 5.

Next, for all of samples 61 to 73, a Cu electrolytic plating film was formed as a first electrode layer of the external terminal electrode. More specifically, Cu ions in a plating solution were deposited on the exposed ends of the plurality of internal electrodes exposed at the end surfaces of the component main body, and the Cu plated depositions were further grown to form Cu electrolytic plating films by physical connections between the respective mutually cross-linked exposed ends of adjacent internal electrodes.

Next, a Ni plating film as a second electrode layer and a Sn plating film as a third electrode layer were formed sequentially by electrolytic plating on the Cu electrolytic plating film as a first electrode layer of the external terminal electrode, thereby completing a laminated ceramic capacitor.

The laminated ceramic capacitors according to each sample were evaluated for the formation of external terminal electrodes, and subjected to a moisture resistance loading test, as shown in Table 5, in the same manner as in Experimental Example 3.

TABLE 5

| Sample Number | Water Repellent Treatment | Removal Step | Silane Coupling Agent | Number of Defectives in Formation of External Terminal Electrodes | Number of Defectives in Moisture Resistance Loading Test |
|---|---|---|---|---|---|
| 61 | Supercritical state | Absence | H | 10/100 | 13/100 |
| 62 | Supercritical state | Absence | M | 0/100 | 0/100 |
| 63 | Supercritical state | Absence | L | 0/100 | 0/100 |
| 64 | Supercritical state | Presence | H | 0/100 | 0/100 |
| 65 | Supercritical state | Presence | M | 0/100 | 0/100 |
| 66 | Supercritical state | Presence | L | 0/100 | 0/100 |
| 67 | Normal immersion | Absence | H | 12/100 | 15/100 |
| 68 | Normal immersion | Absence | M | 0/100 | 16/100 |

TABLE 5-continued

| Sample Number | Water Repellent Treatment | Removal Step | Silane Coupling Agent | Number of Defectives in Formation of External Terminal Electrodes | Number of Defectives in Moisture Resistance Loading Test |
|---|---|---|---|---|---|
| 69 | Normal immersion | Absence | L | 0/100 | 25/100 |
| 70 | Normal immersion | Presence | H | 0/100 | 89/100 |
| 71 | Normal immersion | Presence | M | 0/100 | 89/100 |
| 72 | Normal immersion | Presence | L | 0/100 | 90/100 |
| 73 | No treatment | — | — | 0/100 | 90/100 |

A discussion is provided below regarding the absence or presence of the step of removing the water repellent agent.

When a comparison is made among samples 67 to 69 which employed normal immersion in the water repellent treatment, the use of the silane coupling agent with a higher water repellent ability caused defective samples in the formation of the external terminal electrodes. In addition, for all of samples 67 to 69, defective samples were caused in the moisture resistance loading test.

In contrast to these samples, when a comparison is made among samples 61 to 63 which employed a supercritical state in the water repellent treatment, as in the case of samples 62 and 63, the use of the silane coupling agent with a relatively low water repellent ability caused no defective samples in the moisture resistance loading test, and furthermore, caused no defective samples in the formation of the external terminal electrodes, thus providing a balance between the formation of the external terminal electrodes and the moisture resistance loading test. This is assumed to be because the water repellent agent penetrates more deeply.

It is to be noted that the use of the silane coupling agent with a higher water repellent ability as in the case of sample 61 caused defective samples in the formation of the external terminal electrodes and defective samples in the moisture resistance loading test. This problem is overcome by performing the step of removing the water repellent agent as described below.

For samples 70 to 72 which employed normal immersion in the water repellent treatment, the treatment for removing the water repellent agent decreased the water repellent ability at the surface, thereby causing defective samples in the moisture resistance loading test.

In contrast to these samples, for samples 64 to 66 which employed a supercritical state in the water repellent treatment, the treatment for removing the water repellent agent caused no defective samples in the moisture resistance loading test, and furthermore, caused no defective samples in the formation of the external terminal electrodes, thus providing a balance between the formation of the external terminal electrodes and the moisture resistance loading test. This is assumed to be because the water repellent agent penetrates more deeply, thereby preventing the internal ingress of moisture even after the removal step.

It is to be noted that while the use of the silane coupling agent with a higher water repellent ability without the removal step caused defective samples in the formation of the external terminal electrodes and defective samples in the moisture resistance loading test as in the case of sample 61 described above, the use of the silane coupling agent with a higher water repellent ability caused no defective samples in the formation of the external terminal electrodes and caused no defective samples in the moisture resistance loading test for sample 64 because the removal step was performed. From this result, it was determined that it is effective to perform the step of removing the water repellent agent when using the silane coupling agent with a higher water repellent ability.

For sample 73 without the water repellent treatment, no defective samples were caused in the formation of the external terminal electrodes, whereas many defective samples were caused in the moisture resistance loading test.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising;
    a component main body made of a ceramic and including a pair of end surfaces, a pair of principal surfaces, and a pair of side surfaces;
    a water repellent agent disposed on an outer surface of the component main body; and
    an external terminal electrode disposed on the water repellent agent; wherein
    the water repellent agent includes a $CF_3$— group;
    the external terminal electrode is disposed on the pair of end surfaces, the pair of principal surfaces, and the pair of side surfaces of the component main body;
    the water repellent agent is provided and disposed on an entire end surface of at least one of the pair of end surfaces of the component main body;
    the water repellent agent defines a water repellent film provided between the external terminal electrode and the component main body; and
    the external terminal electrode includes a film made of a fired conductive paste.

2. A ceramic electronic component according to claim 1, wherein the external terminal electrode includes a plating film.

3. A ceramic electronic component according claim 1, wherein the external terminal electrode includes a conductive resin electrode layer.

* * * * *